United States Patent
Baumann et al.

(10) Patent No.: US 8,029,672 B2
(45) Date of Patent: Oct. 4, 2011

(54) FILTER HEAD

(75) Inventors: Hermann Baumann, Tettnang (DE); Walter Gauss, Neukirch (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 1035 days.

(21) Appl. No.: 11/820,895

(22) Filed: Jun. 21, 2007

(65) Prior Publication Data

US 2008/0093279 A1 Apr. 24, 2008

(30) Foreign Application Priority Data

Jun. 20, 2006 (DE) .......................... 10 2006 028 296

(51) Int. Cl.
*B01D 35/00* (2006.01)
*F16K 11/00* (2006.01)

(52) U.S. Cl. .......... 210/340; 55/318; 210/341; 210/424; 210/444; 137/625.18; 137/625.46

(58) Field of Classification Search .................. 210/314, 210/323.1, 340, 341, 424, 440, 443, 450, 210/441; 55/318, 350.1, 482; 137/625.11, 137/625.18, 625.46, 565.26

See application file for complete search history.

(56) References Cited

U.S. PATENT DOCUMENTS

| | | | | |
|---|---|---|---|---|
| 1,861,805 A | | 6/1932 | Lentz | |
| 2,473,032 A | * | 6/1949 | Le Clair | 210/340 |
| 2,526,372 A | * | 10/1950 | Le Clair | 210/91 |
| 2,679,320 A | * | 5/1954 | Walton | 210/102 |
| 2,681,736 A | * | 6/1954 | Voorheis | 210/341 |
| 4,501,297 A | * | 2/1985 | Baker | 137/625.46 |
| 5,082,557 A | * | 1/1992 | Grayson et al. | 210/109 |
| 5,670,038 A | * | 9/1997 | McKinney | 210/98 |
| 6,016,923 A | * | 1/2000 | Baumann | 210/440 |
| 6,139,741 A | * | 10/2000 | McGibbon | 210/323.1 |
| 6,485,636 B1 | * | 11/2002 | Moss | 210/117 |

FOREIGN PATENT DOCUMENTS

| | | |
|---|---|---|
| DE | 80 14 798 | 9/1980 |
| GB | 1 307 163 | 2/1973 |

* cited by examiner

*Primary Examiner* — Joseph Drodge
(74) *Attorney, Agent, or Firm* — Lucas & Mercanti, LLP; Klaus P. Stoffel

(57) ABSTRACT

A filter head, designed to hold at least two filter elements. The filter head having a housing, into which feed channels to, and return channels from, the filter elements are integrated. A rotatable switching drum is provided for selectively opening or closing the channels to control the flow of fluid to the filter elements. The filter head has a cover, which closes off the housing, and a spring element, which produces an axial force which presses one of the sealing surfaces of the switching drum against the cover and the other sealing surface of the switching drum against the housing.

8 Claims, 4 Drawing Sheets

Detail X

FILTER HEAD

BACKGROUND OF THE INVENTION

The invention pertains to a filter head, designed to hold at least two filter elements.

In an internal combustion engine, the fuel is cleaned by two filter elements. These are installed in a stationary filter head. A shutoff lever is used to determine manually the number of filter elements through which the fuel will flow. During normal operation, for example, the fuel will flow through both elements, whereas, during maintenance work, it will flow through only one filter element, which allows the other filter element to be replaced.

A filter head with integrated feed channels and return channels, with two filter elements, and with a shutoff lever is known from U.S. Pat. No. 1,861,805. The lever is connected nonrotatably to a switching drum, so that turning the shutoff lever has the effect of actuating the switching drum, which in turn controls the flow of liquid through the feed and return channels. The switching drum and the filter head are sealed off radially from each other. So that the switching drum is free to rotate inside the filter head, an appropriate annular gap must be present.

A critical aspect of a filter head of this type is that, when one of the filter elements is to be replaced and the filter element has therefore been removed from the filter head, fuel escapes from the filter head through the annular gap. The classification societies for marine engines specify that no leakage may occur while the first filter element is active and the second filter element is being replaced. For this reason, this filter head cannot be used without supplemental measures such as the installation of nonreturn valves. Another critical point is that the shutoff lever must be turned against the force caused by the pressure of the fuel. In the case of a common-rail system, the low-pressure pump produces a pressure level of approximately 8 bars, which means that the shutoff lever is difficult to actuate.

SUMMARY OF THE INVENTION

The invention is based on the task of providing a filter head to hold at least two filter elements which fulfills the requirements of the classification societies and is also easy to operate.

The filter head according to the invention comprises a cover, which closes off the housing, and a spring element, which produces an axial force which presses the sealing surfaces of the switching drum against the cover and the housing. The spring element, especially a set of disk springs, presses one of the end surfaces of the switching drum against the cover and the other end surface against the housing. In practice, the spring element is dimensioned in such a way that any separation between the contact surfaces is reliably avoided. This axial seal is much more effective at reducing the amount of leakage than a radial seal. In practice, this means that, when the first filter element is removed and the second filter element is active, no fuel can drip out of the filter head and reach the environment. In addition, the axial seal has the effect that the amount of force required to actuate the shutoff lever is independent of the delivery pressure of the low-pressure pump of the common-rail system.

The switching drum has a 2-part design. The spring element; axial transfer bores, which communicate with the feed channels and the return channels in the housing and cover; and a driver pin, which transmits rotational movement between the two parts of the switching drum, are installed in the interior of the switching drum.

So that, when one of the filter elements is deactivated, no fuel in the switching drum will be able to leak from an open transfer bore to a closed transfer bore, the distance between two transfer bores is greater than the distance between a transfer bores and the outside diameter of the switching drum. When the pressure cone which forms expands, it will therefore expand not in the direction of the closed transfer bore but rather in the direction of the outer circumference of the switching drum.

A first relief space is provided in the interior of the switching drum to collect leaking fuel. In addition, a second relief space is provided on the circumference of the switching drum. Because the surface structure of metallic seals means that such seals can never be absolutely leak-tight, leaking fuel trickling into the two relief spaces is sent to the pressureless fuel feed line leading to the low-pressure pump.

Exemplary embodiments of the invention are explained below by reference to the attached drawings

DETAILED DESCRIPTION OF THE INVENTION

Figure 1:
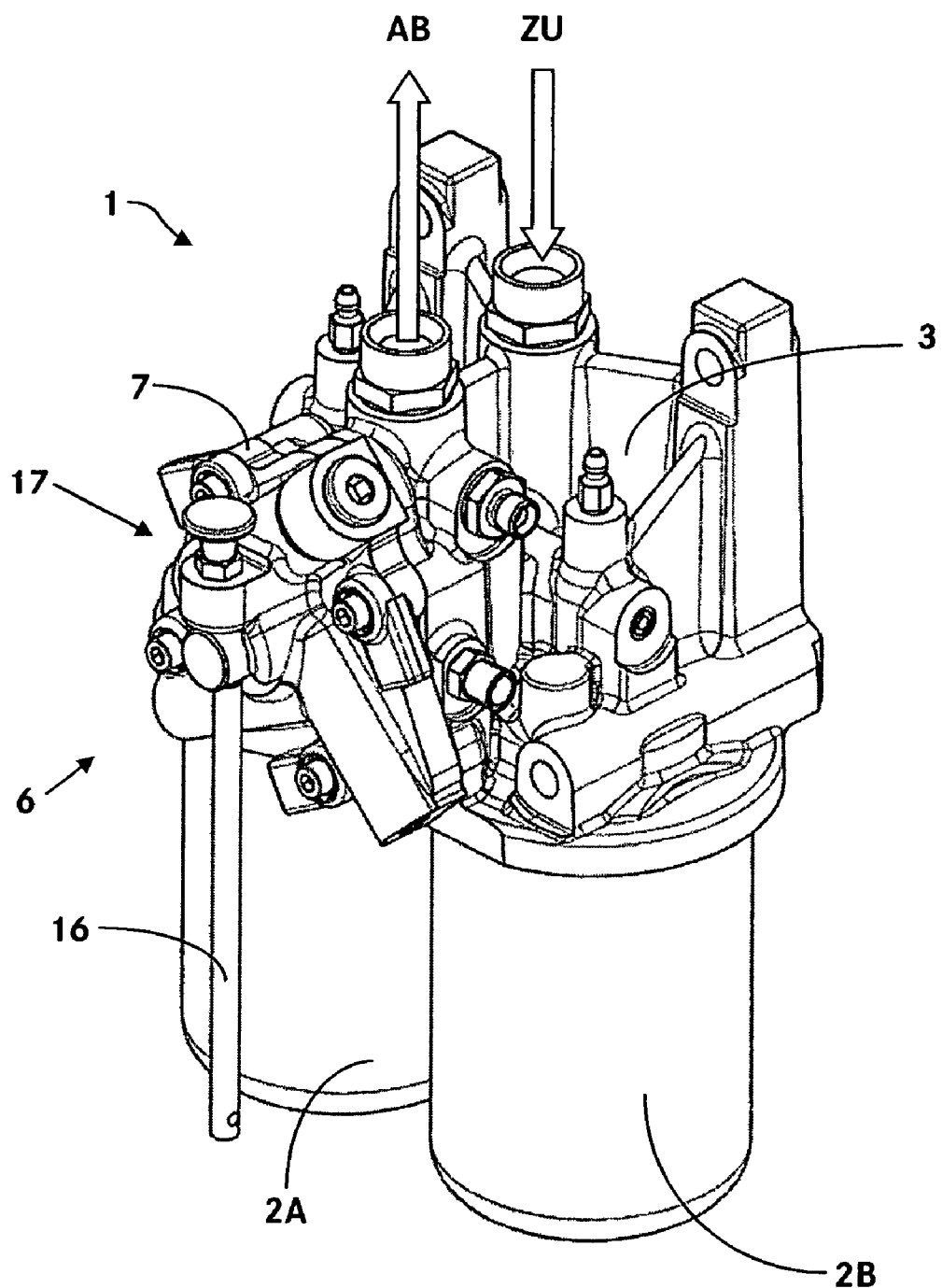
FIG. 1 shows a perspective view of a filter head with two filter elements.

FIG. 1 shows a perspective view of a filter head 1 with two filter elements 2A and 2B. The filter head 1 comprises the following components: a housing 3, a cover 7 to close the housing 3, a switching drum 6 in the interior of the cover and housing, along with a shutoff lever 16, which is connected nonrotatably to the switching drum 6, and a locking pin 17 to hold the shutoff lever 16 in position.

Feed channels to supply uncleaned fuel and return channels to carry away the cleaned fuel are integrated into the interior of the housing 3 and the cover 7. The inflow ZU to the filter head (unclean side) and the outflow AB from the filter head (clean side) are indicated in FIG. 1 by corresponding arrows. The classification societies prescribe for marine engines that it must be possible to replace a filter element while the engine is running, and that, when the first filter element is active, for example, filter element 2A, no leakage may occur when the second filter element, here filter element 2B, is being replaced. This means that no fuel may drip out of the filter head and reach the surroundings. The filter head must therefore be leak-tight.

The arrangement offers the following functionality:

The shutoff lever 16 determines the rotational position of the switching drum 6. The drum 6 in turn releases or shuts off the flow from the feed channels in the housing 3 to the feed channels in the cover 7. The same applies correspondingly to the return channels. During normal operation, the shutoff lever 16 is in the center position, as illustrated in FIG. 1. In the center position, both filter elements 2A and 2B are in operation. In the left position, the filter element 2A is operating, whereas filter element 2B is deactivated. In this position, filter element 2B can be removed from the filter head and the filter insert replaced. In the right position, filter element 2B is operating, whereas the filter element 2A is deactivated. Under these conditions, the filter element 2A can be removed from the filter head 1. The locking pin 17 is used to hold the shutoff lever in the selected position.

Figure 2:
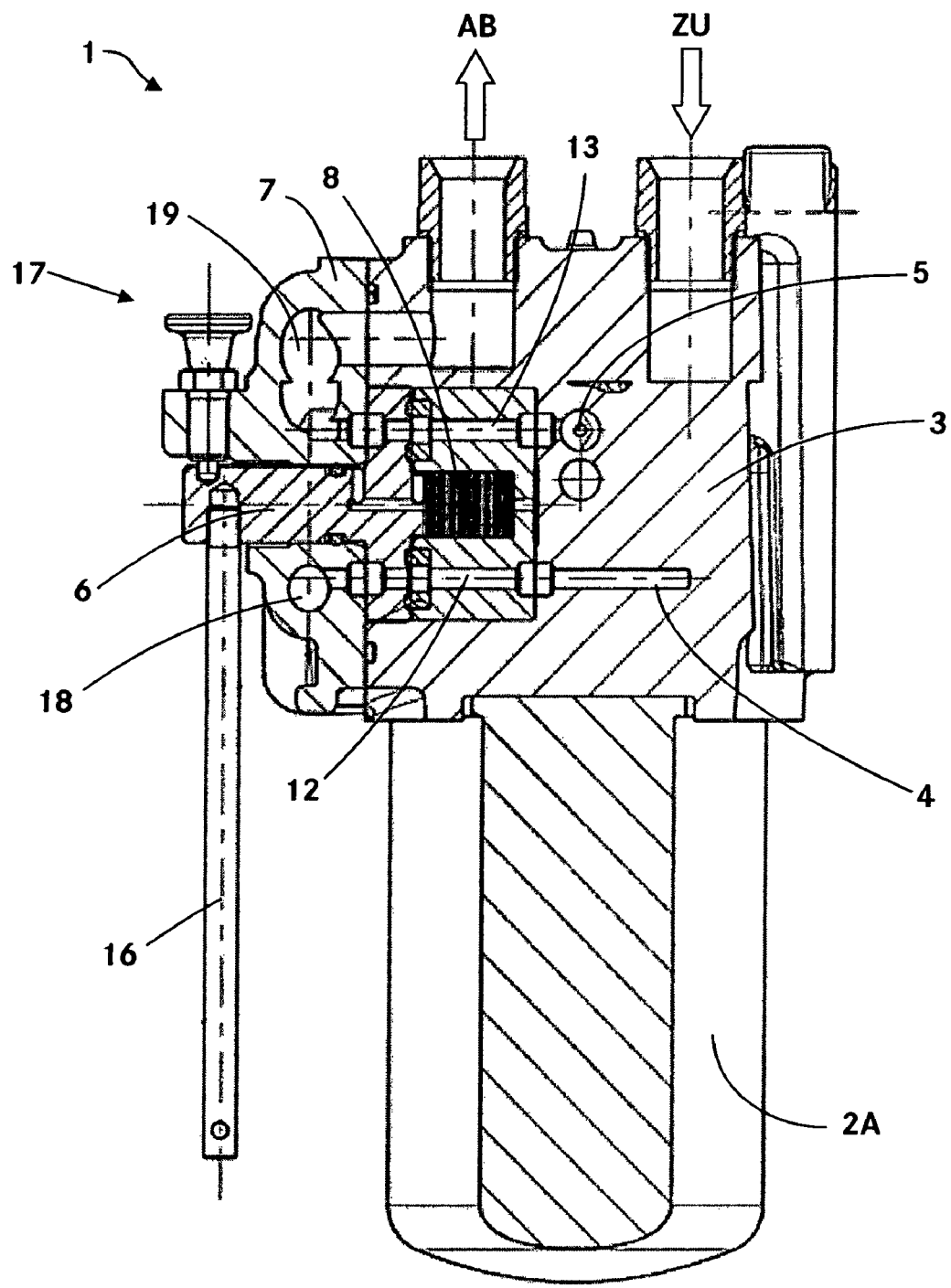
FIG. 2 shows a cross section of FIG. 1.
Figure 3:
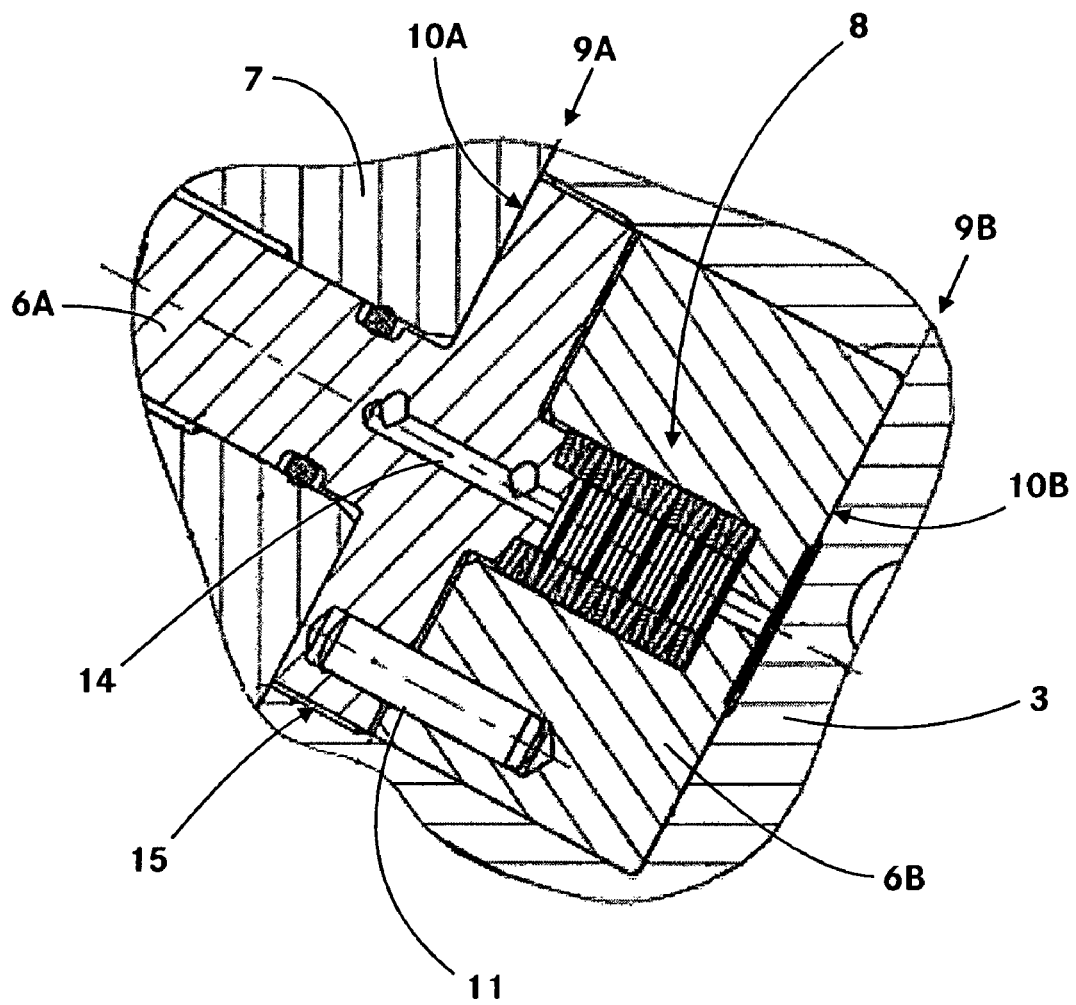
FIG. 3 shows a cross section of the switching drum.

FIG. 2 shows a cross-sectional view of the arrangement according to FIG. 1, where the reference numbers of FIG. 1 have been carried over without change. The further explanation provided here applies to both FIG. 2 and FIG. 3. FIG. 3 shows a magnified cross-sectional view of the switching drum 6, which has been rotated into a position different from that shown in FIG. 2.

Figure 5:
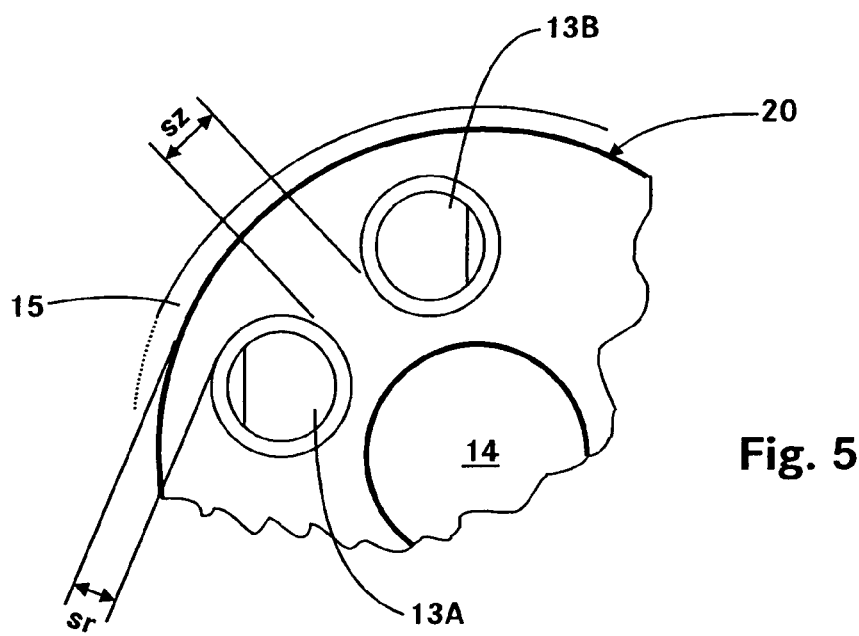
FIG. 5 shows part of FIG. 4 in detail.

In FIG. 2, the shutoff lever 16 is shown in the middle position, as a result of which fuel is able to flow through both filter elements 2A and 2B. The switching drum 6 is supported in the cover 7 and in the housing 3. The switching drum 6 is made up of two parts, 6A and 6B, with an integrated spring element 8. A stack of disk springs is preferably used as the spring element 8. The switching drum 6 (part 6A) is sealed off against the cover 7 in the axial direction by a sealing surface 9A. The switching drum 6 (part 6B) is sealed off against the housing 3, also in the axial direction, by a sealing surface 9B. The sealing force acting against these sealing surfaces 9A and 9B is generated by the spring element 8, which presses the end surfaces 10A and 10B of the switching drum 6 onto the corresponding surfaces of the cover 7 and the housing 3. See here FIG. 3. In contrast to the prior art, in which there is always a small gap present as a result of manufacturing tolerances, in the present design the sealing surfaces rest against each other, metal to metal. Because the surface structure of metallic sealing surfaces means that such seals can never be absolutely leak-tight, additional measures are taken. To collect the fuel which leaks while the filter element is removed, a first relief space 14 is provided in the interior of the switching drum 6 (FIGS. 3 and 5), and a second relief space 15 is provided on the circumference of the switching drum. Leaking fuel trickling through by way of the two relief spaces 14, 15 is thus guided to the pressureless fuel feed side of the low-pressure pump of a common-rail system.

The switching drum 6 has four axial transfer bores, namely, two feed transfer bores 12 and two return transfer bores 13. By way of these transfer bores, the channels in the cover 7 are either connected to or separated from the channels in the housing 3. The transfer bores 12, 13 are located on a common reference circle with an overlap, as a result of which, regardless of the position to which the switching drum 6 has been turned, it is always possible for fluid to pass through one filter element or both filter elements 2. The rotational movement of the first part 6A of the switching drum 6 is transmitted to the second part 6B by a driver pin 11.

As shown in FIG. 2, the flow path of the fuel to be cleaned is as follows: inflow ZU, feed channels 4 in the housing 3, feed transfer bores 12 in the switching drum 6, feed channels 18 in the cover 7, back into the feed channels of the housing 3 (located outside the plane of the drawing), and from there into the filter elements 2A and 2B. The flow path of the cleaned fuel is: from the filter elements 2A and 2B to the return channels 5 of the housing 3, return transfer bores 13 in the switching drum 6, return channels 19 in the cover 7, and via return channels in the housing to the outflow AB.

Figure 4:
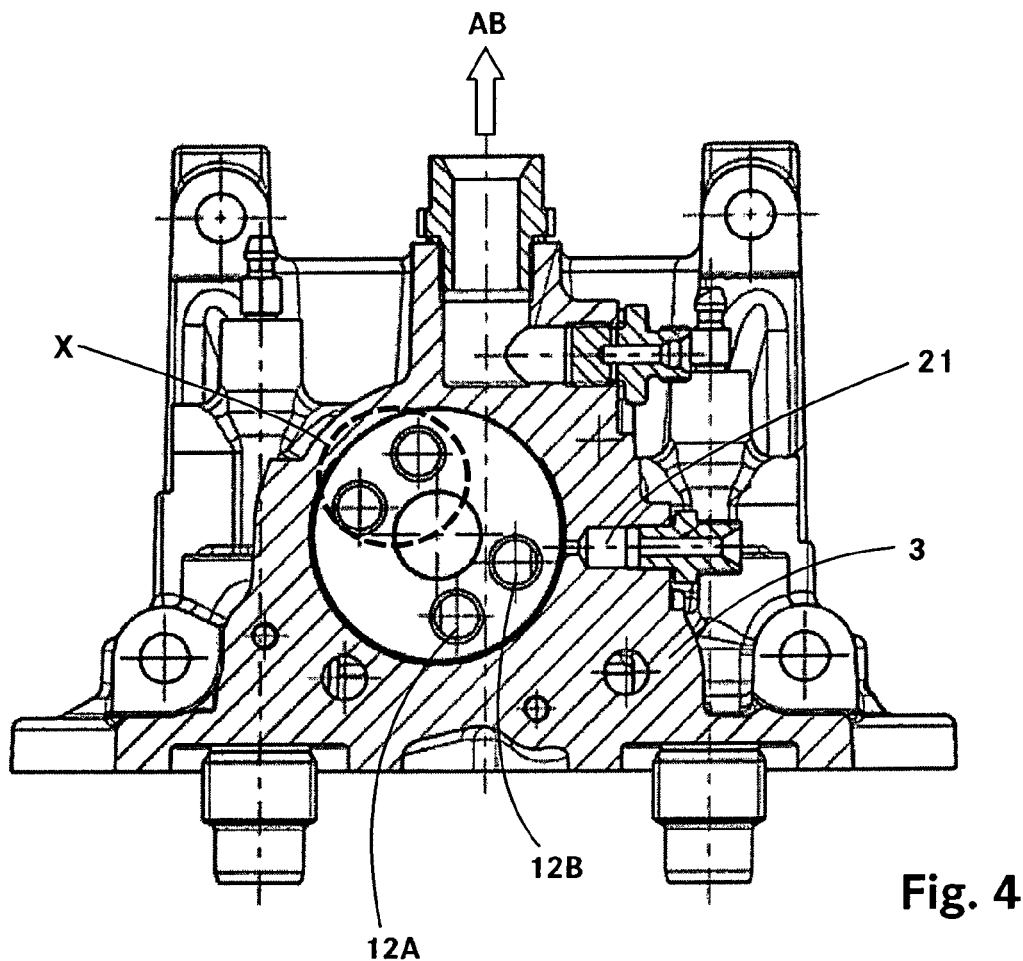
FIG. 4 shows a front view of the housing.

FIG. 4 shows a front view of the housing 3 after the cover 7 has been removed. The further explanation provided here also applies to FIG. 5, which shows a detail X taken from FIG. 4. The two feed transfer bores 12A and 12B and the two return transfer bores 13A and 13B are located in the switching drum 6, through which they extend in the axial direction, that is, perpendicular to the plane of the drawing. The distance between a transfer bore and the circumference 20 of the switching drum 6 is smaller than the distance between two adjacent transfer bores. In detail X of FIG. 5, therefore, the radial distance "sr" between the return transfer bore 13A and the circumference 20 of the switching drum 6 is smaller than the distance "sz" to the adjacent return transfer bore 13B. When the filter element is deactivated, the pressure cone which forms around the return transfer bore 13A, for example, therefore expands to the circumference 20 of the switching drum 6 and from there to the second relief space 15. The leaking fuel accumulating in the second relief space 15 is carried away without pressure through a vent channel 21 (see FIG. 4).

The following advantages of the invention can be derived from the preceding description:

because of the axial seals and the relief spaces, the filter head is leak-tight in correspondence with the rules of the classification societies;

the adjusting force required to actuate the shutoff lever is independent of the pressure level of the fuel;

tightly sealing shutoff units such as ball valves are not needed, which means that the filter head is less expensive; and the filter head is very compact.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. A filter head to hold at least two filter elements, comprising: a housing, into which feed channels to, and return channels from, the filter elements are integrated; a two-part rotatable switching drum for selectively opening and closing the channels and thereby controlling fluid flow to the filter elements; a cover that closes off the housing; and a spring element arranged so as to produce an axial force which presses a first axial sealing surface of the switching drum against the cover and a second axial sealing surface of the switching drum against the housing, wherein a first relief space is provided in an interior of the switching drum and a second relief space is provided on the circumference of the switching drum to collect leaking fluid, the spring element being arranged in the interior of the switching drum.

2. The filter head according to claim 1, wherein the axial force at the sealing surfaces of the switching drum acts against the cover and the housing.

3. The filter head according to claim 1, wherein the switching drum has a driver pin to transmit rotational movement from one part of the switching drum to the other part of the switching drum.

4. The filter head according to claim 3, wherein axial feed transfer bores and axial return transfer bores are arranged in the switching drum so as to communicate with the feed channels and the return channels in the housing.

5. The filter head according to claim 4, wherein a radial distance between a feed transfer bore or a return transfer bore and a circumference of the switching drum is smaller than a distance between two adjacent feed transfer bores or return transfer bores.

6. The filter head according to claim 5, wherein the transfer bores are located on a common reference circle with an overlap so that, regardless of the position to which the switching drum is turned, fluid can flow through at least one filter element.

7. The filter head according to claim 1, wherein the switching drum is supported in the housing and in the cover, and further comprising a shutoff lever nonrotatably connected to the switching drum, whereby the shutoff lever can be operated to rotate the switching drum.

8. The filter head according to claim 7, and further comprising a locking pin arranged on the filter head to hold the shutoff lever in place.

* * * * *